(12) United States Patent
Albert

(10) Patent No.: US 7,498,728 B2
(45) Date of Patent: Mar. 3, 2009

(54) VIBRATING BEAM FORCE SENSOR OF IMPROVED RUGGEDNESS AND MOUNTABILITY

(75) Inventor: William C. Albert, Lakewood, NJ (US)

(73) Assignee: Pressure Systems, Inc., Hampton, VA (US)

( * ) Notice: Subject to any disclaimer, the term of this patent is extended or adjusted under 35 U.S.C. 154(b) by 289 days.

(21) Appl. No.: 11/471,617

(22) Filed: Jun. 21, 2006

(65) Prior Publication Data

US 2007/0295088 A1   Dec. 27, 2007

(51) Int. Cl.
*H01L 41/08* (2006.01)
(52) U.S. Cl. .................. 310/370; 310/312
(58) Field of Classification Search .............. 310/370
See application file for complete search history.

(56) References Cited

U.S. PATENT DOCUMENTS

| 4,215,570 | A |   | 8/1980  | Eer Nisse        |
|-----------|---|---|---------|------------------|
| 4,594,898 | A |   | 6/1986  | Kirman et al.    |
| 4,724,351 | A |   | 2/1988  | Eer Nisse et al. |
| 4,878,385 | A |   | 11/1989 | Lloyd            |
| 5,005,413 | A |   | 4/1991  | Novack et al.    |
| 5,331,242 | A | * | 7/1994  | Petri ............ 310/370 |
| 5,367,217 | A | * | 11/1994 | Norling ......... 310/370 |
| 5,478,975 | A |   | 12/1995 | Ford             |
| 6,450,032 | B1|   | 9/2002  | Albert           |

* cited by examiner

*Primary Examiner*—Mark Budd
(74) *Attorney, Agent, or Firm*—Nixon & Vanderhye PC

(57) ABSTRACT

At least one support tine, disposed generally in parallel to the force sensing tines of a DETF, is added to increase the stiffness of the structure for resisting various strains during assembly. Once the bonding operation is complete, the support tine(s) are cut or broken away from the structure to leave the remaining structure relatively strain free for operation.

17 Claims, 1 Drawing Sheet

VIBRATING BEAM FORCE SENSOR OF IMPROVED RUGGEDNESS AND MOUNTABILITY

BACKGROUND OF THE INVENTION

The present invention relates to double-ended tuning fork (DETF) vibrating beam force transducers. More particularly, the invention relates to an improvement that reduces the DETF's handling fragility and mounting stresses.

The design and application of DETFs is a maturing art in the field of pressure transducers, accelerometers, scales and other instrumentation applications where the physical effect being measured can be converted to a force and the force, in turn, applied to the DETF vibrating beam force transducer. The force then modulates the frequency of the vibrating beam. The use of frequency modulated vibratory sensors has always been attractive in instrumentation applications due to the inherent digital nature of the output signal without the need for A/D conversion. When the sensor material used is quartz crystal, excellent stability of bias frequency and span is realized as well as low temperature sensitivity. In addition, the piezoelectric property of quartz crystal provides a simple means of sustaining beam vibrations using an oscillator circuit electrically connected to electrodes plated on the crystal resonator.

BRIEF DESCRIPTION OF THE INVENTION

The present invention adds at least one support tine, disposed generally in parallel to the force sensing tines of the DETF, to increase the stiffness of the structure for resisting various strains during assembly. Once the bonding operation is complete, the support tine(s) is (are) cut or broken away from the structure to leave the remaining structure relatively strain free for operation.

Thus, the invention may be embodied in a double-ended tuning fork vibrating beam assembly comprising: first and second mount structures; first and second generally parallel vibrating tines operatively coupled at respective longitudinal ends thereof to said first and second mount structures; electrodes for stimulating said vibrating tines into vibration and for monitoring the frequency of vibration wherein the frequency of vibration is related to a direction and amount of force applied to said mount structures; and first and second support tines extending between said mount structures outboard of said vibrating tines thereby increasing the stiffness of the assembly and resisting bending, twisting and bowing strains on said vibrating tines.

The invention may also be embodied in a double-ended tuning fork vibrating beam assembly comprising: first and second mount structures; first and second generally parallel vibrating tines operatively coupled at respective longitudinal ends thereof to said first and second mount structures; electrodes for stimulating said vibrating tines into vibration and for monitoring the frequency of vibration wherein the frequency of vibration is related to a direction and amount of force applied to said mount structures; and at least one support tine extending between said mount structures to rigidify the assembly, thereby to resist bending, twisting and/or bowing strains applied to the assembly, said at least one support tine including indicia for indicating a location for cutting or breaking the at least one support tine to disable said strain resist function.

The invention may further be embodied in a method of mounting a transducer including first and second mount structures and first and second generally parallel vibrating tines operatively coupled at respective longitudinal ends thereof to said first and second mount structures, electrodes for stimulating said vibrating tines into vibration and for monitoring the frequency of vibration wherein the frequency of vibration is related to a direction and amount of force applied to said mount structures, and at least one support tine extending between said mount structures to rigidify the assembly, thereby to resist bending, twisting and/or bowing strains applied to the assembly; the method comprising: bonding said mount structures to an assembly the forces on which are to be measured; and disabling said strain resist function by at least one of cutting or breaking said at least one support tine.

BRIEF DESCRIPTION OF THE DRAWINGS

These and other objects and advantages of this invention, will be more completely understood and appreciated by careful study of the following more detailed description of the presently preferred example embodiments of the invention taken in conjunction with the accompanying drawings, in which.

DETAILED DESCRIPTION OF THE INVENTION

Figure 1:
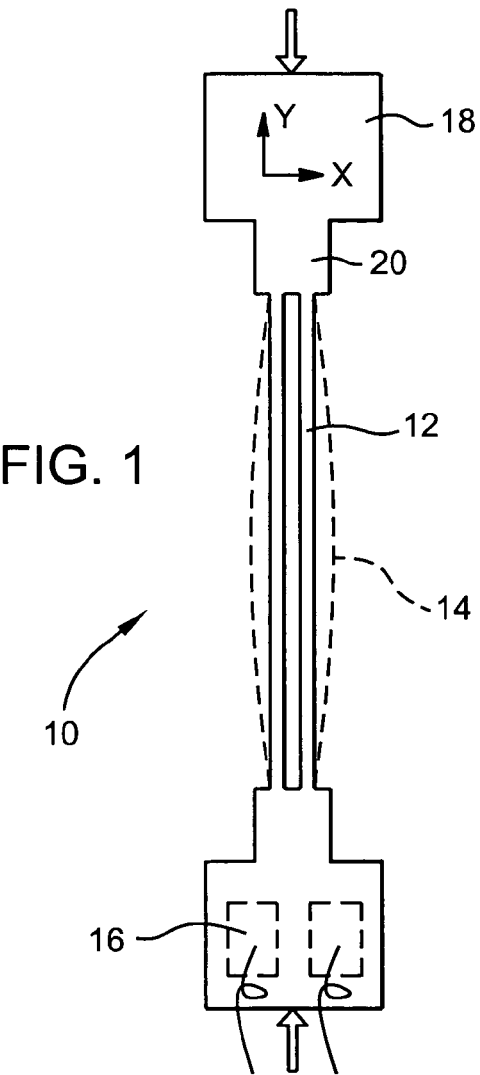
FIG. 1 is a plan view of a typical DETF configuration.

FIG. 1 schematically illustrates a typical DETF design, such as described in U.S. Pat. No. 4,724,351, the disclosure of which is incorporated herein by this reference. Typical overall dimensions in inches are 0.7 long, 0.1 wide and 0.007 thick. However, depending upon the application, the DETF can be significantly larger or smaller. Therefore, the aforementioned dimensions are not to be limiting in respect to the invention disclosed herein.

As schematically illustrated in FIG. 1, the force sensing tines or beams 12 vibrate in fixed-fixed boundary condition mode in the X-Y plane as shown greatly exaggerated by phantom lines 14. As schematically illustrated in part at 16, electrodes are applied to the vibrating tines in a conventional manner and sustain vibration, in association with an oscillator circuit, in the plane of the paper with respect to FIG. 1. To maintain a high vibration Q, the sensing tines vibrate 180° out of phase from each other so as to cancel each others bending moment and shear reactions at the tine roots.

Mount structures 18 are defined at each longitudinal end of the DETF 10. In the illustrated example, the force sensing tines 12 are connected to the mount structures 18 via shoulder sections 20, sometimes referred to as outriggers. The shoulder sections serve as transition members to the mount structures of the assembly. As such, the shoulder sections improve the performance of the DETF as explained in the '351 patent. The mount structures 18 provide the means by which the DETF is mounted to another part of the transducer structure. In this regard, DETF applications include pressure transducers, accelerometers, scales or other applications, where the physical effect being measured is converted to a force to be sensed by the DETF. U.S. Pat. No. 6,450,032, the disclosure of which is incorporated herein by this reference, describes typical pressure sensor transducer and accelerometer applications.

The sensing axis of the DETF force transducer illustrated in FIG. 1 is the Y axis. Because the vibrating sensing tines 12 are long and thin, they have string-like properties along the sensing axis. As with a vibrating string, the vibrating frequency of the tines will increase in response to a tension force. However, unlike a string, the vibrating tine also has beam-like properties and will also decrease its vibrating frequency as a result of a compressive force. This force-frequency effect is the operating principle of vibrating beam force transducers, which is now very well known in the vibratory sensor art. The DETF structure is typically fabricated using a photo etch process, whereby the various features are acid etched through a quartz crystal wafer.

For a sensing application, the DETF must be mounted to another structure, which converts a physical effect such as acceleration or pressure into an axial tension or compression force on the DETF. Examples of such combined structures are given in the '032 patent. For best performance, the DETF depends upon the axial force applied to each tine to be precisely identical. If the axial forces are unequal, each tine will want to resonate at a slightly different frequency, which will cause anomalies in the frequency force relationship. These anomalies will, in turn, result in errors in the output signal. To avoid this source of output signal errors, the DETF must be bonded to the sensing structure in as nearly a strain-free condition as possible.

Figure 2:
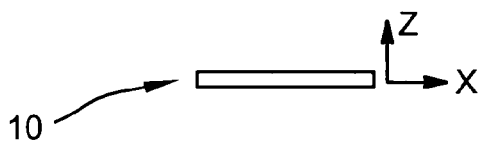
FIG. 2 is an end view of the structure of FIG. 1.

For a typical DETF configuration, as illustrated in FIG. 1, the sensing tines are long and thin and also close together along the sensing axis of the structure. Also, the DETF is relatively thin along the Z axis as illustrated in FIG. 2. For these reasons, the DETF structure is very flexible and thus susceptible to bending and twisting about its various axes. Such bending and twisting strains can be introduced during the assembly operation when the DETF is bonded to another structure. In this regard, typical bonding operations employ clamping forces to the mount portion of the DETF structure at each end and can also employ relatively extreme temperature differences. As a result, the sensing tines can be subjected to slight bending, twisting and bowing strains that will diminish the DETF's potential performance.

The invention provides an improved DETF structure 110 that resists the bending, twisting and bowing strains during the assembly operation that may diminish its potential performance substantially without altering the functional configuration of the DETF. More particularly, the invention adds at least one support tine 22 to rigidify the DETF structure for manipulation and bonding, which at least one support tine is adapted to be disabled, e.g. by being removed, following bonding/assembly, so that the DETF can operate in a substantially conventional manner. Thus, the DETF provided in accordance with example embodiments of the invention is substantially identical in operative structure to conventional DETF structures but adds thereto at least one breakaway or removable support tine 22 to protect the structure from damage during the assembly process.

Figure 3:
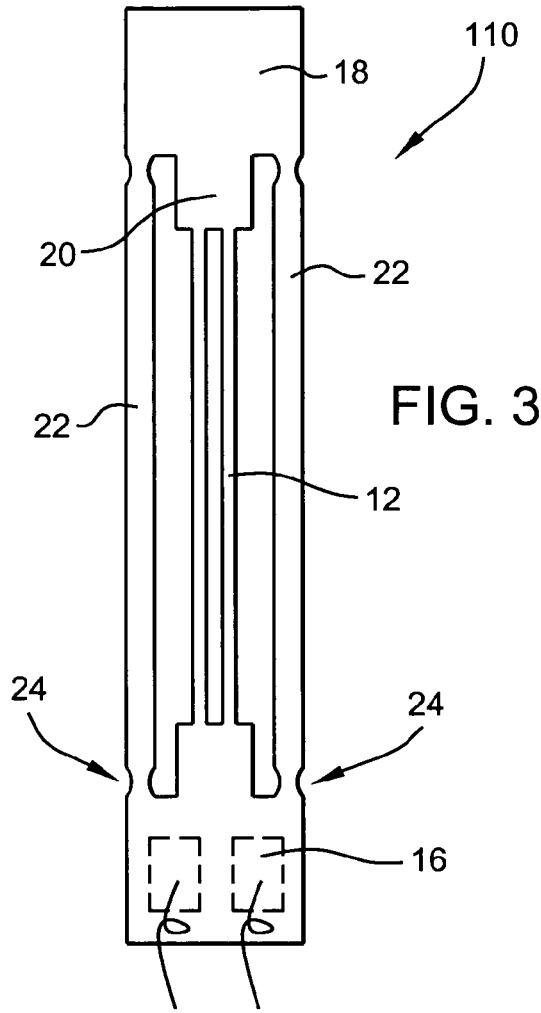
FIG. 3 is a plan view of a DETF with support tines according to an example embodiment of the invention.
Figure 4:
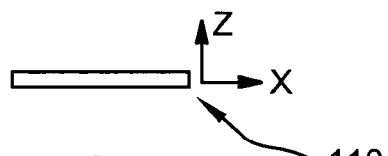
FIG. 4 is an end view of the structure of FIG. 3.

In the illustrated example embodiment of FIGS. 3 and 4, first and second support tines 22 are provided, preferably as far as possible outboard of the sensing tines 12. The addition of the support tines, which in the illustrated embodiment have a transverse dimension greater than the corresponding transverse dimension of the sensing tines, greatly increases the stiffness of the structure and thus the structure's ability to resist the various strains that can be produced as a result of the bonding operation during assembly.

After the bonding operation is complete, the support tine(s) 22 are disabled from providing their support and rigidifying function. In an example embodiment, the support tines are disabled by being severed, most preferably removed, from the structure, to leave the remaining portion of the structure relatively strain free and in substantially the same configuration as the conventional DETF 10 that was modified to include a support tines consistent with the invention.

Removal of the support tines 22 is achieved in an example embodiment by cutting or breaking away the support tines from the mounting structures 18 at the longitudinal ends of the transducer. The removal of the support tine(s) can be facilitated by providing indicia that indicates where the support tine is to be severed from the remaining structure. The indicia may be in the form of visual indicia such as a mark or visually recognizable color difference and/or by defining a weakened portion of the support tine such as with perforation(s) and/or breakaway notch(es). In the illustrated example embodiment, the indicia is in the form of a visually distinguishable weakened portion that is the locus for breaking or cutting to remove the support tines. More specifically, at least one break away notch 24 is defined where each support tine 22 is to be severed. In the illustrated embodiment, two diametrically opposite breakaway notches 24 are defined adjacent each longitudinal ends of the support tines. So locating the breakaway notches facilitates substantially complete removal of the support tines. However, it is to be understood that functional disabling of the support tines may be achieved by removing less than substantially the entire support tine structure.

In addition to substantial elimination of the mounting strain as described hereinabove, the stiffness introduced by the support tine(s) also increases the ruggedness of the structure. This means that the delicate DETF structure can be more easily manipulated during assembly and bonding operations, to greatly reduce the likelihood of breakage. Thus, in turn leads to cost savings.

As mentioned above, DETF structures are typically manufactured using a photo-etch process. Therefore, the configuration of the invention including at least one support tine can be defined by the art work and masks used in the process. Since they may be used over and over again, the artwork and masks are a non-recurring cost. Thus, the addition of support tines according to example embodiments of the invention introduces no additional DETF manufacturing cost.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A double-ended tuning fork vibrating beam assembly comprising:

first and second mount structures;

first and second generally parallel vibrating tines operatively coupled at respective longitudinal ends thereof to said first and second mount structures;

electrodes for stimulating said vibrating tines into vibration and for monitoring the frequency of vibration wherein the frequency of vibration is related to a direction and amount of force applied to said mount structures; and first and second support tines extending between said mount structures outboard of said vibrating tines thereby increasing the stiffness of the assembly and resisting bending, twisting and bowing strains on said vibrator tines during manipulation and bonding/assembly, said support tines being adapted to be disabled following bonding/assembly to disable their strain resist function whereby the vibrating tines can operate as designed, wherein the first and second support tines have a transverse dimension at every point along their length that is greater than the corresponding transverse dimension of the vibrating tines.

2. An assembly as in claim 1, wherein each said support tine includes indicia for indicating a location for cutting or breaking the support tine to disable said strain resist function.

3. An assembly as in claim 2, wherein said indicia comprises an area of weakness in each said support tine.

4. An assembly as in claim 3, wherein said area of weakness includes at least one notch.

5. An assembly as in claim 4, wherein said area of weakness comprises first and second diametrically opposite notches in said respective support tine.

6. An assembly as in claim 4, wherein there is at least one notch at each longitudinal end of said support tine, adjacent said mount structures.

7. A double-ended tuning fork vibrating beam assembly comprising:
first and second mount structures;
first and second generally parallel vibrating tines operatively coupled at respective longitudinal ends thereof to said first and second mount structures;
electrodes for stimulating said vibrating tines into vibration and for monitoring the frequency of vibration wherein the frequency of vibration is related to a direction and amount of force applied to said mount structures; and
at least one support tine extending between said mount structures to rigidify the assembly, thereby to resist bending, twisting and/or bowing strains applied to the assembly, said at least one support tine including indicia for indicating a location for cutting or breaking the at least one support tine to disable said strain resist function,
wherein said indicia comprises an area of weakness in the at least one support tine,
wherein said area of weakness includes at least one notch, and
wherein each said area of weakness comprises first and second diametrically opposite notches in said support tine.

8. An assembly as in claim 7, wherein there is first and second diametrically opposite notches at each longitudinal end of said support tine, adjacent said mount structures.

9. An assembly as in claim 7, wherein each said mount structure includes a shoulder section between which said vibrating tines extend.

10. An assembly as in claim 7, wherein said mount structures, vibrating tines, and at least one support tine are integrally formed in one piece.

11. A method of mounting a transducer comprising:
providing a transducer including:
first and second mount structures and first and second generally parallel vibrating tines operatively coupled at respective longitudinal ends thereof to said first and second mount structures,
electrodes for stimulating said vibrating tines into vibration and for monitoring the frequency of vibration wherein the frequency of vibration is related to a direction and amount of force applied to said mount structures, and
at least one support tine extending between said mount structures to rigidify the assembly, thereby to resist bending, twisting and/or bowing strains applied to the assembly;
bonding said mount structures to an assembly the forces on which are to be measured; and
disabling said strain resist function by at least one of cutting or breaking said at least one support tine.

12. A method as in claim 11, wherein said disabling comprises removing the support tine.

13. A method as in claim 12, wherein substantially the entire support tine is removed.

14. A method as in claim 11, wherein the at least one support tine includes indicia for indicating a location for cutting or breaking the support tine.

15. A method as in claim 14, wherein the indicia is an area of weakness.

16. A method as in claim 15, wherein the indicia includes at least one notch.

17. A method as in claim 11, wherein there are first and second support tines disposed outboard of the vibrating tines.

* * * * *